United States Patent Office 3,700,536
Patented Oct. 24, 1972

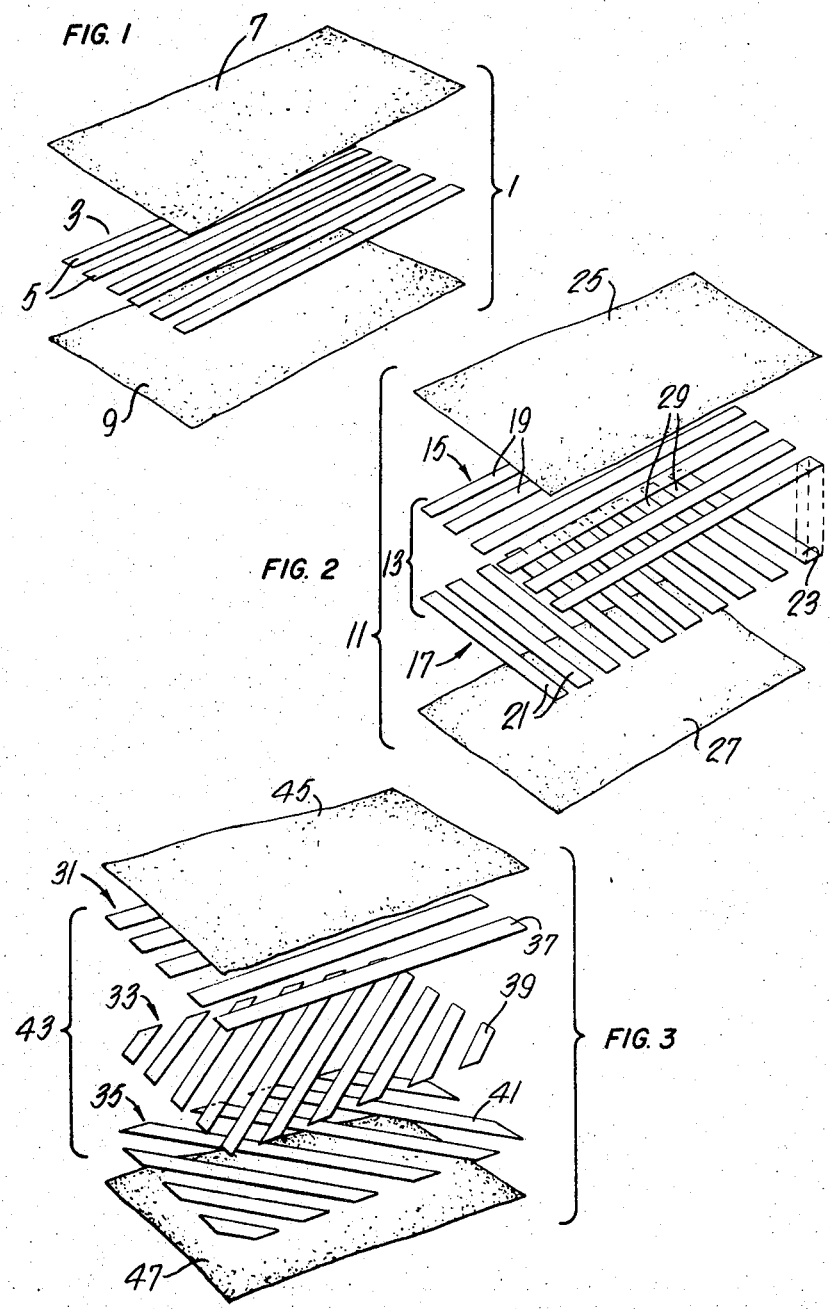

3,700,536
TAPE REINFORCED LAMINATED PRODUCT
Joseph Maria Bentvelzen, Raleigh, N.C., and Alan Dennis Millington, Montreal, Quebec, Canada, assignors to Consolidated Papers (Bahamas) Limited, Nassau, Bahamas
Filed Dec. 9, 1970, Ser. No. 96,489
Claims priority, application Canada, Dec. 18, 1969, 70,332
Int. Cl. B32b 5/12, 29/02
U.S. Cl. 161—57
10 Claims

ABSTRACT OF THE DISCLOSURE

A laminate and method of making same formed from a central reinforcing layer comprising a plurality of spaced-apart oriented ribbons of polymeric material, arranged in parallel side-by-side relationship, said ribbons having a thickness of .5 to 3 mil, a width of greater than 1/32 inch, an ultimate elongation of less than 50%, and a lateral spacing between ribbons of less than 1 inch.

BACKGROUND OF THE INVENTION

(a) Field of invention

The present invention relates to a laminate. More particularly, the present invention relates to a paper laminate suitable for use as bag paper, tapes, carpet and lumber wraps, non-woven textiles or light material and having a high tear strength coupled with a relatively high tensile strength while retaining, in some cases, some of the breathing characteristics for porosity of the paper.

(b) Description of prior art

Laminated papers, particularly laminated bag papers are known. Such laminates generally include a layer of paper sandwiched between two continuous layers of plastic material such as polyethylene (i.e. polyethylene-coated paper coated both sides) which is a laminate having good water-resistant characteristics. It is also known to manufacture bags or the like from a polyethylene-coated paper coated one side. These laminates do not have the same degree of water resistance as paper coated both sides. The cost of such laminates is also relatively high, thus limiting the use in the packaging field where costs are of prime importance.

Both the above-described coated paper laminates have the smooth feel of plastic and have a high tear propagation rate which is disadvantageous in bag construction, thereby requiring relatively thick coatings to obtain the required strength characteristics. Such laminates also are coated over their whole surface area with the plastic material and therefore do not retain the breathing characteristics or porosity of paper.

Laminates, wherein a layer of polyethylene film is sandwiched between a pair of paper layers, are also known. These laminates, of course, do not have the slippery feel of plastic and have a higher tensile strength since the film can be oriented, whereas the coating could not. However, they still have the relatively high tear propagation rates and the increased strength is primarily in the direction of orientation of the film which normally is in the machine direction of the paper. Here again, the tear strength is not high and the tensile strength, as above indicated, is primarily in the direction of film orientation and the resultant product does not retain the breathing characteristics of the paper.

To retain the breathing characteristics of the paper, reinforced laminates have been made using the woven scrims or individual filaments between layers of paper. Some such products incorporate a plurality of layers of filaments with each layer having the longitudinal axis of the filaments thereof arranged at an angle to the filaments of another layer.

SUMMARY OF INVENTION

It is an object of the present invention to provide a relatively inexpenisve paper laminate having a high tensile strength and high resistance to tear propagation, suitable for use in the manufacture of paper products wherein high tear and tensile strength are advantageous. It may also permit the retention of the breathing characteristics depending on the manner in which the laminate is formed.

Broadly, the present invention relates to a laminate comprising a pair of paper layers with an intermediate layer secured to and sandwiched between said paper layers, said intermediate layer including a plurality of laterally-spaced, substantially flat, longitudinaly-oriented, pastic ribbons, having a thickness of .5 to 3 mil, a width of greater than 1/32 inch, an ultimate elongation of less than 50%, and a lateral spacing between said ribbons of less than 1 inch with the maximum number of ribbons per lateral inch of said laminate being about 8.

BRIEF DESCRIPTION OF THE DRAWINGS

Further features, objects and advantages of the present invention will be evident from the following detailed description taken in conjunction with the accompanying drawings in which:

FIG. 1 is an exploded view of an embodiment of a laminate incorporating a central reinforcing layer consisting of spaced-apart, polymeric ribbons or tapes;

FIG. 2 is an exploded view of a second embodiment of the laminate having a pair of central reinforcing layers forming spaced-apart, polymeric tapes or strips with the strips of each layer extending transversely to the strips of the other layer;

FIG. 3 illustrates a further embodiment incorporating three reinforcing layers;

DESCRIPTION OF PREFERRED EMBODIMENTS

Figure 4:
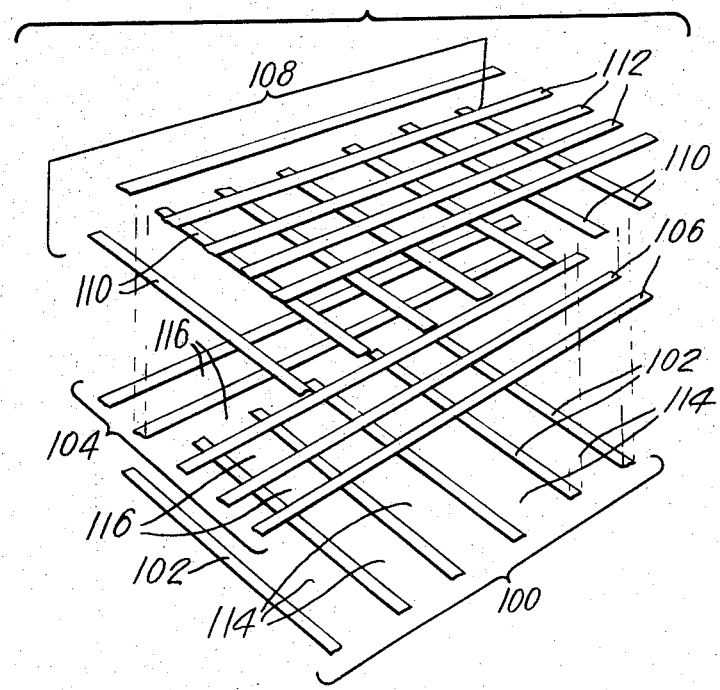
FIG. 4 is an exploded view of a further embodiment of a laminate incorporating tapes extending in the machine and cross-machine directions and forming an interlaid reinforcing layer.

As shown in FIG. 1, the laminate 1 is composed of a central reinforcing layer 3 formed from a set of spaced-apart ribbons or tapes 5 of polymeric material. Each tape or strip 5 extends parallel to its adjacent strip and longitudinally of the webs of cellulosic material 7, 9, i.e. in the machine direction of the webs 7, 9. The webs 7, 9 and the strips 5 are adhesively secured together and the webs 7, 9 may also be directly adhesively secured together in the spaces 10 between the ribbons 5. However, if porosity of the laminate is to be maintained, there should be little or no adhesive in the spaces 10 between the ribbons, since adhesives tend to block off the pores in the paper and reduce the porosity of the laminates to a minimum.

In the second embodiment of the present invention, as shown in FIG. 2, the laminate 11 has a reinforcing layer 13 made up of two sets 15, 17 of spaced-apart tapes 19, 21 with the tapes 19 of the set 15 extending substantially perpendicular to the tapes 21 of the set 17. The tapes of one set will extend substantially parallel to the length or machine direction of the pair of webs 25, 27 of cellulosic material between which the reinforcing layer 13 is received. The individual tapes 19 and 21 of each of the sets 15 and 17 may be secured together at their crossing points 23 by a suitable adhesive and the tapes 19, 21 are also secured to the webs 25, 27 which in turn may be secured together in the gaps 29 between the tapes 19, 21.

If desired, three or more sets of tapes may be used in forming the reinforcing layer as shown in FIG. 3. The reinforcing layer 43 here consists of three layers of substantially parallel tapes 31, 33, 35 sandwiched between a pair of cellulosic webs 45, 47. This construction is substantially the same as that described above with respect to FIGS. 1 and 2 with the individual tapes 37, 39, 41 of the sets 31, 33, 35 adhesively secured together and to the cellulosic webs 45, 47.

Referring to FIG. 4, a preferred form of reinforcing layer has been shown in exploded form. This reinforcing layer is composed of a first layer of tapes 100 composed of a plurality of spaced apart tapes 102, a second layer 104 composed of tapes 106, a third layer 108 composed of tapes 110, and a fourth layer composed of tapes 112. The number of layers may be varied, if desired. It can be seen that the tapes 102 and 110 are substantially parallel, as are the tapes 106 and 112, but the tapes 102 and 110 extend substantially perpendicular to the tapes 106 and 112. Thus, assuming that the tapes 102 and 108 extend in the cross-machine direction, there are alternate layers formed of spaced tapes extending in the machine and cross-machine directions. The tapes 110 of the layer 108 are aligned to lie in the spaces 114 between the tapes 102. Similarly, the tapes 112 are received within the spaces 116 between the tapes 106. In this manner, when the tapes of the various layers are combined together to form a reinforcing layer, a simulated woven arrangement is obtained and the tapes are interlaced. This arrangement provides a relatively strong material.

Figure 5:
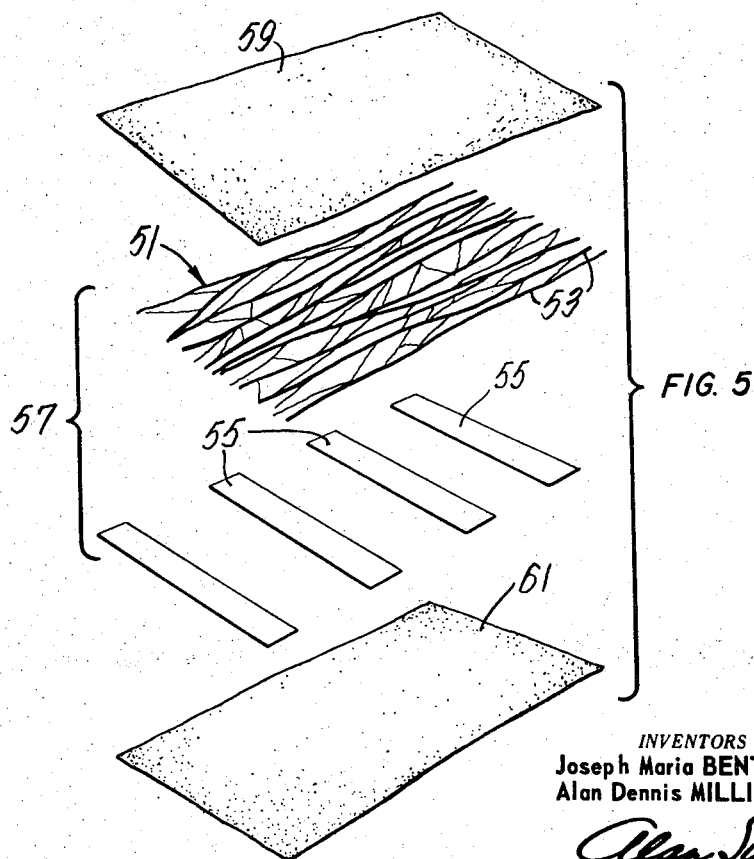
FIG. 5 illustrates yet another embodiment incorporating a reinforcing layer constructed in accordance with the present invention and a fibrillated film in combination therewith.

Yet another embodiment of the present invention is shown in FIG. 5, wherein the reinforcing layer 57 is formed by at least one set of tapes or ribbons 55 and a fibrilated film 51. Preferably, the fibrilated film 51 will have its filaments 53 extending substantially parallel to one another and in the machine or cross-machine direction of the cellulosic webs 59, 61. The reinforcing tapes 55 are preferably perpendicular to the filaments of the fibrillated film 51. As were the laminates described above, the layers forming the laminate are secured together by an adhesive means in any suitable manner.

The fibrillated web described hereinabove has been described in detail in applicant's co-pending U.S. patent application, Ser. No. 40,843, filed May 27, 1970, which describes a specific laminate incorporating such a fibrillated web between a pair of paper webs to form a nonwoven fabric or similar product.

Having generally described the arrangements of the various layers and tapes or ribbons in several different embodiments of the present invention, the characteristics of each tape or ribbon will now be described in detail. The characteristics of these ribbons are of ultimate importance if a satisfactory product is to be obtained.

It has been found that the thickness of the tape of conventional material normally should not be less than .5 mil or the resultant laminate will not have an adequate increase in tensile strength over and above that obtainable when no film strips are used. When a thickness of 3 mils is exceeded it has been found that the increases in strength do not warrant the extra expense incurred in using the thicker film.

The width of the tape strip or ribbon is also very important. It has been found that this ribbon should be no less than 1/32 inch wide and preferably between .1 and .2 inch wide. This width of tape, coupled with a very specific lateral spacing between the tapes of less than 1 inch and preferably in the range of 0.05 to .3 inch provides the ultimate product and the required tear strength.

Another important characteristic of the ribbon or tape is its ultimate elongation. It has been found that the ultimate elongation of the tapes or ribbons should not exceed 50% and preferably should correspond, in most cases, with that of the paper. Thus, the ribbons should be oriented so that their ultimate elongation is in the range of 5 to 50%; otherwise, the paper or cellulosic material breaks too soon before the tapes.

It has further been found that each layer of cellulosic material should have a basic weight in the range of 8 to 120 lbs. per ream. If desired, the layers of cellulosic material may be coated, for example, with polyethylene or polyvinylidene chloride for barrier properties.

The laminated products of the present invention may be manufactured in any suitable manner. The tapes in general may be manufactured from any suitable commercially available polymer; but, generally, would be manufactured from a polymer selected from the group consisting of: polyethylene, polypropylene, polyvinyl alcohol or similar, readily-available, preferably inexpensive materials. The polyvinyl alcohol would generally be used where a disposable laminated product is to be produced, since the polyvinyl alcohol can be made water-dispersible.

The adhesive used in forming the laminate should preferably be a low elastic modulus type adhesive to permit slight movement of the tape with respect to each other without breaking the bond, thereby improving the flexibility. Two commercially available adhesives that have been found satisfactory for use with polyethylene and polypropylene tapes are Jedbond, a water-based adhesive made by Jedco Chemical Corp., 601 North MacQuester Parkway, Mount Vernon, N.Y. 10552, and Hycar (P 2100 x 20), a solvent-based adhesive manufactured by B. F. Goodrich. Alternatively, the tapes may be heat sealed to the paper layers, for example, by flame laminating as disclosed in applicants' co-pending U.S. patent application Ser. No. 819,752 filed Apr. 28, 1969.

Yet another system of bonding uses tapes of two components, for example, a tape made of a reinforcing film and a bonding film such as polypropylene and polyethylene respectively, and by heating the laminate above the softening point of the lower melting point bonding film, i.e. the melting point of the polyethylene, whereby the polyethylene binds the materials together. The polyethylene layer covers at least one side of the polypropylene tapes. If an impervious product is to be produced, it may be desirable to use a sheet of polyethylene coextensive in area with that of the laminate. In such cases, it generally will be unnecessary to have a sheet of polyethylene between each adjacent layer of the laminate, generally only a single sheet of polyethylene between said two layers would be sufficient and by causing the polyethylene to permeate between the tapes, the paper liners as well as the tapes may be bonded together. Since the reinforcing material is an oriented tape then care must be taken to anneal the tape at about the softening temperature of the adhesive layer to ensure there is no undue shrinkage of the reinforcing tapes in the laminating step.

One system of obtaining relatively uniform yet spaced distribution of a polyethylene adhesive layer would be to use polyethylene in the form of a fibrillated film spread to the required degree in place of the sheet of polyethylene referred to hereinabove. This would not provide an impervious layer but would be satisfactory for many purposes.

The laminate may be formed by feeding the various layers together through a nip with adhesive in proper position on the layers thereby pressing the laminate together and setting the adhesive. Alternatively, the reinforcing layer, when it is formed for a plurality of different sets of strips may be prelaminated and then incorporated between a pair of cellulosic webs. Preferably, when the cellulosic webs are being pressed, a resilient pressure should be applied, i.e. through the use of rubber-covered rolls or the like.

When laminating a plurality of sets together to form a reinforcing layer per se a pair of heated metal press rolls may be used. However, care must be taken that the annealing temperature of the film forming the strips is not exceeded, i.e. the temperature will generally be below the annealing temperature which is in the range of 100 to 150° C. and the pressure will generally be in the range of 50 to 150 lbs. per lineal inch of the nip.

In some cases, it may be desirous to heat the tapes above the annealing temperature to cause same to disorient and shrink and therefore produce a laminated product having different characteristics and feel than would normally be produced.

The following table provides specific examples of the present invention compared with the films per se used as the reinforcing.

|  | Number of tapes per inch | Thickness of tapes or film (mils) | MD | | CD | | Mullen, p.s.i. | Torsion tear test | |
|---|---|---|---|---|---|---|---|---|---|
| Laminate | | | Tensile (lbs./in.) | Stretch (percent) | Tensile (lbs./in.) | Stretch (percent) | | Machine direction, in oz. | Cross direction in. oz. |
| Polypropylene cross tapes (pp): | | | | | | | | | |
| 1. Ext. paper/PP/Ext. paper | 4 | 2 | 100 | 9.1 | 82 | 6.8 | 210 | 600 | 590 |
| 2. Kraft/PP/Kraft | 4 | 2 | 92 | 2.1 | 60 | 3.5 | 150 | 600 | 600 |
| 3. News/PP/News | 4 | 2 | 40.2 | 2.1 | 35.0 | 3.0 | 100 | 600 | 620 |
| Polyethylene cross tapes (PE): | | | | | | | | | |
| 4. Ext. Paper/PE/Ext. paper | 4 | 2 | 96 | 8.4 | 72 | 8.0 | | 480 | 490 |
| 5. Ext. Paper/PE/Ext. paper | 6 | .8 | 72 | 9.8 | 56 | 7.2 | 160 | 330 | 370 |
| Films polypropylene cross laminated: | | | | | | | | | |
| 6. Ext. paper/PP/Ext. paper | | .8 | 72 | 9.5 | 58 | 8.4 | | 170 | 185 |
| 7. News/PP/News | | .8 | 40.1 | 1.3 | 25.0 | 2.9 | 120 | 20 | 20 |
| Polyethylene; 8. Ext. paper/PE/ Ext. paper | | 2 | 72 | 9.3 | 50 | 7.0 | 170 | 250 | 275 |

NOTE.—Ext.=Extensible; Kraft=Kraftpaper; News=Newsprint.

A comparison of the tear strength of the laminates incorporating film with laminates made in accordance with the present invention shows about a three-fold increase with the present invention. Improvement is also shown in the tensile strength of the laminates.

While the disclosure has primarily dealt with ribbons laid in side-by-side relationship in one or a plurality of different directions, for example in a pair of mutually perpendicular directions, it will be apparent that a woven scrim using such tapes or ribbons may be substituted for the specific arrangement wherein the ribbons are mutually perpendicular depending on the ultimate use of the laminate. Where characteristics of drape and feel are important, a woven scrim preferably will not be used.

We claim:

1. A laminate comprising at least one layer of paper and a reinforcing layer secured thereto, said reinforcing layer including a plurality of laterally spaced substantially flat ribbons made from a thermoplastic polymeric material which has been strengthened by orientation, said ribbons having a thickness of .5 to 3 mil, a width of at least 1/32 inch, an ultimate elongation of less than 50% and there being a spacing of less than 1 inch between adjacent ones of said ribbons, the elongation characteristics of the reinforcing layer substantially corresponding to those of the layer of paper or paperboard whereby the layers function substantially the same under tension.

2. A laminate as defined in claim 1, wherein said intermediate layer comprises two layers of said ribbons, with the ribbons of one layer arranged at an angle with respect to the ribbons of the other layer.

3. A laminate as defined in claim 1, wherein said reinforcing layer comprises three juxtaposed sets of spaced-apart ribbons, with said ribbons in each set extending at an angle of substantially 60° to the ribbons of adjacent sets.

4. A laminate as defined in claim 1 wherein each of said ribbons has an ultimate elongation of 5 to 50%.

5. A laminate as defined in claim 4 wherein each of said ribbons has a width in the range of 1/32 to .2 inch.

6. A laminate as defined in claim 5 wherein said lateral spacing between adjacent ribbons is in the range of 0.05 to .3 inch.

7. A laminate as defined in claim 1, wherein said reinforcing layer further includes a fibrillated film having filaments extending substantially prependicular to said plastic ribbons.

8. A laminate as defined in claim 7 wherein each of said ribbons has an ultimate elongation in the range of 5 to 50%, a width between 1/32 and .2 inch, said tapes being uniformly spaced in the range of 0.5 to 1 inch.

9. A laminate as defined in claim 1, wherein said reinforcing layer is composed of a plurality of sets of ribbons with said ribbons of said sets interlaced to form a simulated woven intermediate layer.

10. A laminate as defined in claim 9 wherein each of said ribbons has an ultimate elongation in the range of 5 to 50%, a width between 1/32 and .2 inch, said ribbons being uniformly spaced in the range of 0.5 to 1 inch.

References Cited

UNITED STATES PATENTS

| 3,575,777 | 4/1971 | Allport | 161—143 |
| 3,567,566 | 3/1971 | Bandel et al. | 161—57 |
| 2,901,455 | 8/1959 | Jurras | 161—58 |
| 3,485,705 | 12/1969 | Harmon | 161—402 |
| 3,439,865 | 4/1969 | Port et al. | 161—402 |
| 3,183,142 | 5/1965 | Tierney | 161—58 |

WILLIAM A. POWELL, Primary Examiner

U.S. Cl. X.R.

161—58, 84, 143, 402